United States Patent [19]

Ward et al.

[11] Patent Number: 4,861,537

[45] Date of Patent: Aug. 29, 1989

[54] PROCESS OF MAKING A SINTERED POLYBENZIMIDAZOLE ARTICLE

[75] Inventors: Bennett C. Ward, Pineville; Edwardo Alvarez, Houston, Tex.; Ralph S. Blake, Lake Wylie, S.C.

[73] Assignee: Hoechst Celanese Corp., New York, N.Y.

[21] Appl. No.: 223,856

[22] Filed: Jul. 25, 1988

Related U.S. Application Data

[62] Division of Ser. No. 92,493, Sep. 3, 1987, Pat. No. 4,814,530.

[51] Int. Cl.$^4$ .................... B29C 67/04; C08G 69/26
[52] U.S. Cl. .................... 264/126; 264/235; 264/237; 264/331.12; 264/331.19; 264/331.21
[58] Field of Search ............... 264/126, 235, 237, 320, 264/331.11, 331.12, 331.19, 331.21, 344, 346, 348; 528/342, 344, 347, 348

[56] References Cited

U.S. PATENT DOCUMENTS

| | | | |
|---|---|---|---|
| 3,340,325 | 9/1967 | Suffredini | 264/126 X |
| 3,386,969 | 6/1968 | Levine | 528/342 X |
| 3,387,058 | 6/1968 | Levine | 528/342 X |
| 3,518,234 | 6/1970 | Hara et al. | 264/331.19 X |
| 4,238,538 | 12/1980 | Manwiller | 264/126 X |
| 4,302,413 | 11/1981 | Howe et al. | 264/126 |
| 4,436,682 | 3/1984 | Knopp | 264/126 X |
| 4,448,687 | 5/1984 | Wang | 264/235 X |
| 4,512,894 | 4/1985 | Wang | 264/235 X |
| 4,717,619 | 1/1988 | Letinski | 264/331.11 X |

OTHER PUBLICATIONS

Harb, M. E. et al., "Cure Cycle Optimization of Compression Molded High Molecular Weight Celazole PBI Resin", 32nd International Sampe Symposium (1987), pp. 795–806.

Jones, J. F. et al., "Polybenzimidazole Composites", International Conference on Composite Materials IV, Aime, Warrendale, Pa. (1985), pp. 1591–1599.

Ward, B. C., "Use of Polybenzimidazoles in Compression Molding", Fabricating Composites '86 Conference, Baltimore, Md. (1986), pp. EM 86-704-1-12.

Ward, B. C., "Effects of Molecular Weight and Cure Cycle on the Properties of Compression Molded Celazole PBI Resin", 32nd International Sampe Symposium (1987), pp. 853–867.

*Primary Examiner*—Jeffery Thurlow
*Assistant Examiner*—Leo B. Tentoni
*Attorney, Agent, or Firm*—Forrest D. Stine

[57] ABSTRACT

Sintered polybenzimidazole articles are obtained by compacting a particulate, dried polybenzimidazole resin under a pressure of 2,000 to 10,000 psi in a mold, heating the formed article to a temperature in the range of 825° to 950° F. for at least four hours, cooling the polybenzimidazole article to below 800° F. while maintaining the article under a pressure of 2,000 to 10,000 psi, and thereafter heating the constrained formed polybenzimidazole article to a temperature in the range of 825° to 950° F. for at least one hour.

6 Claims, No Drawings

1

PROCESS OF MAKING A SINTERED POLYBENZIMIDAZOLE ARTICLE

This is a division of application Ser. No. 092,493, filed Sept. 3, 1987, now U.S. Pat. No. 4,814,530.

This invention relates to sintered polybenzimidazole molded articles of manufacture and methods for manufacturing such articles. The sintered polybenzimidazole articles can be employed in the manufacture of gaskets, seals, o-rings and valves in oil field down-hole, geothermal, petrochemical and industrial applications.

BACKGROUND OF THE INVENTION

Polybenzimidazoles are polymers of high thermal stability and excellent resistance to oxidative or hydrolytic degradation. As taught by the published literature, these polymers may be prepared, for example, by melt polymerizing an aromatic tetraamine and a diphenylester or an anhydride of an aromatic or heterocyclic dicarboxylic acid in a one or two stage process; see, for example H. Vogel and C. S. Marvel, Journal of Polymer Science, Vol. L, pages 511–539 (1961); and U.S. Pat. Nos. Re. 26,065; 3,174,947; 3,509,108; 3,551,389; 3,433,772; and 3,655,632. In particular, U.S. Pat. No. 3,551,389 discloses a two stage process for the production of aromatic polybenzimidazoles, in which the monomers are heated at a temperature above 170° C. in a first stage melt polymerization zone until a foamed prepolymer is formed. The foamed prepolymer is cooled, pulverized, and introduced into a second stage polymerization zone where it is heated again to yield a polybenzimidazole polymer product.

It has also been known to prepare polybenzimidazoles from the free dicarboxylic acids or the methyl esters of such acids rather than the phenyl esters or anhydrides in a melt polymerization process. Polybenzimidazoles produced utilizing certain dicarboxylic compounds as monomers have repeating units of the following formula:

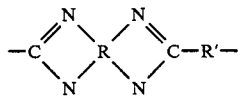

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

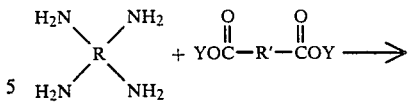

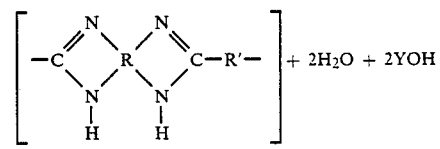

in which R and R' are as previously defined. Such polybenzimidazoles are produced by the reaction of a mixture of (1) at least one aromatic tetraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

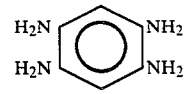

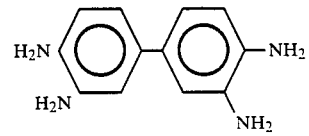

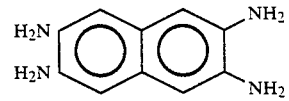

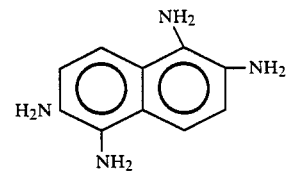

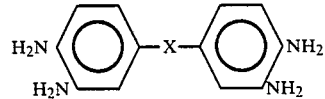

where X represents —O—, —S—, —SO$_2$, —C—, or a lower alkylene group, such as —CH$_2$—, —(CH$_2$)$_2$—, or —C(CH$_3$)$_2$—. Among such aromatic tetraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The compounds which comprise the dicarboxylic component of this invention are defined by the formula:

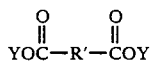

in which the Y's may be hydrogen, aryl or alkyl with no more than 95% of the Y's being hydrogen or phenyl. The dicarboxylic component may therefore consist of a mixture of a free acid with at least at one diester and/or monoester; a mixture of diester(s) and/or monoester(s); or a single dialkyl ester, monoester or mixed aryl-alkyl or alkyl/alkyl ester but can consist completely of free acid or diphenyl ester. When Y is alkyl, it preferably contains 1 to 5 carbon atoms and is most preferably methyl. When Y is aryl, it may be any monovalent aromatic group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiopene, and pyran.

Dicarboxylic acids which may be utilized in free or esterified form as described are aromatic dicarboxylic acids such as those illustrated below:

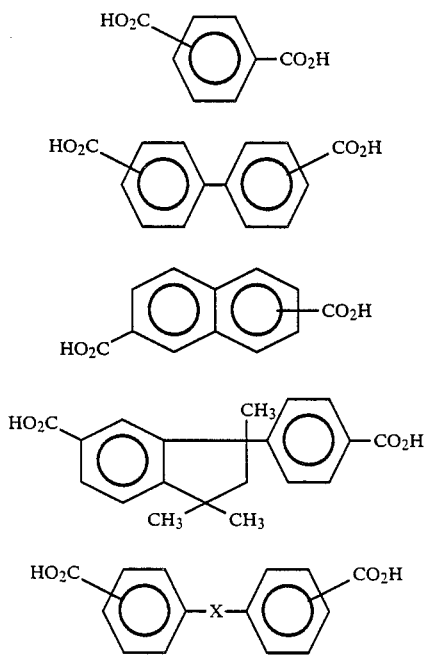

where X is as defined above. For example, the following diacids can suitably be employed: isophthalic acid; terephthalic acid; 4,4'-biphenydicarboxylic acid; 1,4-naphthalene-dicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylsulfonedicarboxylic acid; 4,4'-diphenylthioetherdicarboxylic acid. Isophthalic acid is the dicarboxylic acid which in free or esterified form is most preferred for use in the process of the present invention.

The dicarboxylic component can be one of the following combinations: (1) at least one free dicarboxylic acid and at least one diphenyl ester of a dicarboxylic acid; (2) at least one free dicarboxylic acid and at least one dialkyl ester of a dicarboxylic acid, and (3) at least one diphenyl ester of a dicarboxylic acid and at least one dialkyl ester of a dicarboxylic; and (4) at least one dialkyl ester of a dicarboxylic acid. The dicarboxylic moieties of the compounds of each combination may be the same or different and the alkyl groups of the alkyl esters of combinations (2), (3) and (4) generally contain 1 to 5 carbon atoms and are most preferably methyl.

The dicarboxylic component can be employed in a ratio of about 1 mole of total dicarboxylic component per mole or aromatic tetraamine. However, the optimal ratio of reactants in a particular polymerization system can be easily determined by one of ordinary skill in the art.

Examples of polybenzimidazoles which may be prepared according to the process as described above include:

poly-2,2'-(m-phenylene)-5,5'-bibenzimidazole;
poly-2,2'-(biphenylene-2''2''')-5,5'-bibenzimidazole;
poly-2,2'-(biphenylene-4''4''')-5,5'-bibenzimidazole;
poly-2,2'-(1'',1'',3''trimethylindanylene)-3''5''-p-phenylene-5,5'-bibenzimidazole;
2,2'-(m-phenylene)-5,5'-bibenzimidazole/2,2-(1'',1'',3''-trimethylindanylene)-5'',3''-(p-phenylene)-5,5'-bibenzimidazole copolymer;
2,2'-(m-phenylene)-5,5-bibenzimidazole2,2'-biphenylene-2'',2''''-5,5'-bibenzimidazole copolymer;
poly-2,2'-(furylene-2'',5'')-5,5'-bibenzimidazole;
poly-2,2'-(naphthalene-1'',6'')-5,5'-bibenzimidazole;
poly-2,2'-(naphthalene-2'',6'')-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2''-(m-phenylene)-5,5''-di(benzimidazole) propane-2,2; and
poly-ethylene-1,2-2,2''-(m-phenylene)-5,5''-dibenzimidazole) ethylene-1,2 where the double bonds of the ethylene groups are intact in the final polymer.

Poly-1,2'-(m-phenylene)-5,5'-bibenzimidazole, a preferred polymer, can be prepared by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

Although the sintering of polybenzimidazole (PBI) resins in the manner described herein is not known in the art, the compression molding of PBI resins and the sintering of a mixture of PBI polymer and prepolymer has been effected. Levine (Encycl. Polymer Sci. Technol., 11, 188) reported in 1969 the matched metal compression molding of low molecular weight PBI having an inherent viscosity (IV) of 0.05–0.1 dl/g as a 0.4% weight solution in 97% sulfuric acid. The compression product was reported to have a tensile strength (unfilled) of 17,000–25,000 psi and a compressive strength (yield) of 54 thousand pounds per square inch.

The process for sintering PBI polymers in which a prepolymer was used as a sintering aid is described in U.S. 3,340,325. As described therein, the prepolymer was prepared by reacting a diphenyl ester of an aromatic dicarboxylic acid and an aromatic tetraamine to a degree short of substantial infusibility. The prepolymer is fusible at temperatures in the range of from about 200° F. to about 500° F. The mixture of PBI prepolymer and PBI polymer having a melting point greater than 1500° F. was introduced into a mold with sufficient heat and pressure applied to cause the prepolymer to become fluid and the mixture was maintained under sufficient heat and pressure to cure the prepolymer.

The previously described prepolymer molding processes have two distinct disadvantages. The prepolymer off-gases significant amounts of phenol and water during cure, necessitating the care in tailoring a cure cycle and leading to either high void contents or limited part thickness. The prepolymer also contains detectable amounts of residual 3,3',4,4'-tetraaminobiphenyl (TAB) monomer. As such, care must be taken when handling this material to insure that no worker contact occurs.

In 1985 Jones et al reported (International Conference on Composite Materials IV, AIME, Warrendale, Pa., p 1591) the compression molding of PBI polymer at temperatures of 600° to 800° F., pressures of 2000 psi and final hold times of over one hour. The product molded articles had tensile strengths of 7000 psi. Employing the described process, only one part could be made per mold per cycle, with total cycle times limited to one per normal eight hour shift and part thickness was effectively limited to less than one inch.

Ward[1][2] and Harb, et al[3] reported matched metal die compression molding of PBI at temperatures of up to 875° F., pressures of 5,000 to 10,000 psi and cycle time of 4–8 hours which resulted in molded PBI parts, limited to ¼ inch in thickness, with tensile strength of up to 21,000 psi. In order to achieve high tensile strength, however, it was necessary to utilize a resin with an IV of 1.1 dl/g. Use of resin with lower molecular weight resulted in correspondingly lower tensile strength of the molded article.

[1] Ward, B. C., Fabricating Composites '86, SME Composites Group, Baltimore, Md. (September, 1986) EM86-704.
[2] Ward, B. C., 32nd International SAMPE Symposium, Anaheim, CA, (Apr. 6–9, 1987) pp 853–867.
[3] Harb, M. E., Treat, J. W., Ward, B. C. ibid pp 795–806.

In addition, the resin used typically had a particle size such that it would pass through a 35 mesh screen. Resin with smaller particle size (passing through a 100 mesh screen) was found to be extremely difficult to mold, with the articles molded from 100 mesh resin exhibiting severe cracking, so as to render them useless for any testing or utility.

Also, molded articles made via matched metal die compression molding exhibited significant blistering and dimensional distortion when exposed to temperatures of 900° F. for as little as 5 minutes. This phenomenon greatly limits the utility of these articles in high temperature resistant applications.

SUMMARY OF INVENTION

By the invention, sintered PBI molded articles are obtained having high compressive strength, excellent tensile and flexual strength, good fatigue properties, excellent hardness and low coefficient of friction, outstanding glass transition and heat deflection temperatures, relatively low coefficient of thermal expansion, high chemical resistance and high volume resistivity. Large and small sintered PBI resin articles can be obtained employing process steps comprising cold compacting in a mold a PBI resin in particulate form having an inherent viscosity greater than 0.4, heating the molded article, cooling the molded article while maintaining the article in a pressurized state, and postcuring the molded article.

DESCRIPTION OF PREFERRED EMBODIMENT

The PBI polymers suitable in preparing the sintered articles of this invention are those previously described having an inherent viscosity (IV) of greater than 0.4 dl/g when measured at a concentration of 0.4 gram of polymer in 100 ml of 97 weight percent sulfuric acid at 25° C. The PBI polymer is in particulate form with the particle size such that the particles pass through a 100 mesh screen. The smaller particles as employed permit the production of filled PBI articles utilizing fillers such as graphite, glass, chopped carbon fiber, etc. The PBI resin has a residual water and volatiles concentration below 0.1 weight percent. To obtain a resin having less than 0.1 weight percent water and volatiles, the resin can be heated in an oven to a temperature of at least 350° F. and maintained at this temperature for at least 4 hours.

The dried particulate PBI resin is placed in a mold which is sealed so as to prevent the flow of oxygen into the mold during the compacting step. If a filler is employed, the filler is mixed with the resin and the mixture placed in the mold with the filler comprising from 0.1 to 80 weight percent of the resin and filler mixture. At ambient temperature (less than 40° F.) the resin is compacted at a pressure in the range of 2000 to 20,000 pounds per square inch (psi), preferably at a pressure in the range of 5000 to 20,000 psi, for a period of at least one minute.

The molded PBI article is then heated to a temperature in the range of 825°–950° F., preferably to a temperature of at least 875° F., and maintained at that temperature for a period of time of at least 4 hours and normally for a period ranging from 4 to 24 hours. This heating step can be conducted while the resin is maintained under pressure or after the pressure is removed.

Following the heating step, the resn is maintained under a pressure in the range of 2000 to 20,000 psi until the resin is cooled to a temperature below 800° F. If the heating step was conducted after removal of the pressure, the PBI article is compressed prior to cooling, to a pressure in the range of 2000 to 20,000 psi and maintained at the elevated pressure until the temperature of the article falls below 800° F.

The PBI article is then postcured by heating to a temperature in the range of 825°–950° F. under constraint so as to prevent expansion of the article, maintaining the article at this temperature during the heating step for a period of at least one hour.

Although a single sintered, molded PBI article can be produced in accordance with the above-described process, the simultaneous manufacture of several PBI molded articles can be effected employing a single mold. For example, multiple sintered PBI disks can be obtained by alternatively placing or "stacking" PBI resin and plugs in the mold prior to the initial pressurization or compaction step.

The sintered PBI articles of this invention exhibit outstanding mechanical, thermal, electrical and chemical properties. The molded PBI has a tensile strength and modulus of greater than 19,000 psi and $0.8 \times 10^6$ psi, respectively (ASTM D 638), a flexural strength and modulus of greater than 20,000 psi and $0.8 \times 10^6$ psi, respectively (ASTM D 790), and a compressive strength and modulus of greater than 50,000 psi and $0.8 \times 10^6$ psi, respectively (ASTM D 695).

The sintered PBI articles exhibit no blistering or dimensional distortion when subjected to a temperature as high as 900° F. for 5 minutes. The glass transition temperature of the PBI articles is in the range of 780°–825° F. as determined by Differential Scanning Calorimetry or Dynamic Mechanical Analysis and the articles have a limiting oxygen index greater than 55% (ASTM D 2863). The PBI articles have a typical coefficient of thermal expansion of 13 $10^{-6}$ in/in/°F. at temperatures of 75°–300° F. and 18 $10^{-6}$ in/in/°F. at temperatures of 390°–570° F. as determined by thermal mechanical analysis.

The sintered molded PBI articles have a dielectric strength greater than 500 volts per mil (ASTM D 149), an arc resistance typically 186 sec. (ASTM 495) and a volume resistivity of typically greater than $8 \times 10^{14}$ ohm-cm (ASTM D 257). The product PBI articles have a Rockwell E hardness greater than 100 (ASTM D 785) and a Shore D Durometer hardness greater than 95 (ASTM D 2240). The density of the molded article is greater than 1.27 grams per cc.

The sintered PBI articles are also highly chemically resistant to ketones, organic acids, oil well brines, oil well sour gas and also chemically resistant to aromatic, aliphatic and halogenated hydrocarbons. Accordingly, the sintered molded PBI articles of manufacture are particularly effective in applications where requirements cannot be met by other resins—in extreme high temperatures, in harsh chemical environments, or in applications where durability and wear resistance are important. Molded PBI articles of manufacture are particularly useful in gaskets, seals, o-rings and valves in oil-field down holes, and in geothermal, petrochemical, and other industrial applications.

The invention will be further illustrated by way of the following examples, the specifics of which should be considered non-limiting and exemplary of the invention.

EXAMPLE I

PBI [poly-2,2'-(m-phenylene)-5,5'-bibenzimidazole] 100 mesh powder resin having an inherent viscosity of 0.55 dl/g was dried for 16 hours in a forced air convection oven at 390° F. The dried resin (1.41 lbs.) was then loaded into a 2.5 inch diameter, 30-inch long mold fitted with plugs at both ends, and cold pressed on a 75-ton hydraulic press at 6000 psi pressure for three minutes.

The unpressurized and unclamped mold was transferred to a forced air convection oven with a temperature setting of 875° F. The mold remained in the oven for 6.5 hours.

The mold was then transferred from the oven to the 75-ton press and 6000 psi pressure was immediately applied to the mold. The press pistons were observed to compact the plastic PBI polymer inside the mold to a volume approximately 50% of the hot, uncompacted volume. The pressure was maintained on the mold for 20 minutes and then gradually reduced over 5 minutes to 2000 psi. The pressure was then removed and the mold permitted to cool to room temperature.

Thereafter the mold was fitted with clamps to prohibit outward movement of the plugs and placed in a 875° F. oven for two hours. The mold was then removed, allowed to cool to room temperature, the clamps removed, and the molded PBI rod was ejected from the mold using a small hydraulic press.

The molded PBI article was 2.5 inches in diameter, 6 inches long, and had a density of 1.28 grams per cc. No cracks, voids or other imperfections were visible. One-eighth inch thick disks were machined from the rod via conventional machining techniques using a lathe. The average tensile strength of the formed disks was 21,000 psi (n=22, 4.2 standard deviation). Tensile elongation (strain) was 2.8% and tensile initial modulus was 0.88 mpsi. Machined ⅛ inch thick disks did not exhibit dimensional distortion or weight loss when placed in a 900° oven for 5 minutes.

EXAMPLE II

The process of Example I was repeated, with the exception that the compressive strength of specimens machined from the rod was measured and determined to be 58,000 psi at yield (n=11, 0.5 standard deviation), measured at 11% compression. Compressive modulus was 0.88 mpsi.

EXAMPLE III

The process of Example I was repeated with the exception that 0.25 lb. of dried resin was loaded into a one inch diameter, 30-inch length mold. The heating time of the initial heating step was changed to 3.7 hours.

The product PBI one inch diameter, six inch long molded rod showed excellent integrity, color and machinability. The compressive properties of the specimen produced by the process of this Example were identical to those described with respect to the specimens produced in Example III. The density of the PBI molded article was 1.28 grams per cc.

EXAMPLE IV

The method of Example III was repeated with the exception that the PBI resin was not dried in a convection oven prior to molding. After the molding cycle, the molded PBI had a distinctly purple cast. The rod easily broke apart using moderate hand pressure, with the interior of the molded part having high void content. This Example illustrates the necessity of employing a dried resin in the sintering process.

EXAMPLE V

Process of Example I was repeated with the exception that the mold diameter was five inches and the PBI resin was packed in the mold in six 0.23 lb. increments, separated by plug separators. The mold was held in the oven during the heating step for eight hours.

The resulting molded PBI disks were five inches in diameter, ¼ inch thick, and had a density of 1.27 grams per cc. The tensile strength, elongation (ASTM D 638) and tensile modulus of the disks were (standard deviation) 19,000 psi (2000), 2.4% (0.3), and 0.88 mpsi (0.06), respectively.

EXAMPLE VI

The chemical resistance of the molded PBI articles was determined by exposing the PBI articles prepared in accordance with the procedure of Example I for a period of seven days to a number of chemicals. The chemical, conditions of exposure and percent of the tensile strength retained after the seven day exposure are shown below in the following Table 1:

TABLE 1

| Chemical | Temp (°F.) | Pressure, psi | % Tensile Retained |
|---|---|---|---|
| "Mobile Bay" sourgas (15.0% $H_2S$, 15.0% $CO_2$ and 70.0% methane) | 450 | 2200 | 100 |
| Gasoline/kerosene (50/50 liquid mixture) | 200 | ambient | 100 |
| Xylene/toluene (50/50 liquid mixture) | reflux | ambient | 100 |
| Methylene chloride | reflux | ambient | 100 |
| Methylethylketone | reflux | ambient | 100 |
| Acetic Acid (glacial) | 200 | ambient | 100 |
| Brine (aqueous bromide solutions) | 200 | ambient | 100 |
| Caustic (15 wt %, NaOH) | 200 | ambient | 70 |

EXAMPLE VII

The process of Example I is repeated, with the exception that the secondary heating (post curing) cycle, consisting of fitting the mold with clamps and heating in an 875° F. oven for two hours, is omitted. The molded PBI article is 2.5 inches in diameter, 6 inches long, and has a density of 1.28 grams per cc. No cracks, voids or other imperfections are visible. Tensile strength of the molded PBI is 21,000 psi. Machined ⅛ inch thick disks exhibit significant dimensional distortion (over 10% dimensional change) if placed in a 900° F. oven for 5 minutes, demonstrating the criticality of employing a postcuring step.

While the present invention has been herein described in what is presently conceived to be the most preferred and exemplary embodiments thereof, those in this art may recognize that many modifications may be made thereof, which modifications shall be accorded the broadest scope of the appended claims so as to encompass all equivalent methods, apparatus and products.

We claim:

1. A process which comprises compacting a particulate polybenzimidazole resin having a particle size such that the particles pass through a 100 mesh screen in a mold to a pressure in the range of 2,000 to 20,000 psi at ambient temperature for a period of at least one minute, said resin having a water and volatiles concentration below 0.1 weight percent and an IV of at least 0.4, heating the compacted polybenzimidazole resin in a first heating step to a temperature in the range of 825° to 950° F. and maintaining said compacted polybenzimidazole resin in said temperature range for a period of at least four hours so as to form a molded article, cooling said polybenzimidazole molded article to a temperature below 800° F. while maintaining said article under a pressure in the range of 2,000 to 20,000 psi, and thereafter heating the formed polybenzimidazole article to a temperature in the range of 825° to 950° F. in a second heating step under constraint, maintaining the article at this temperature for a period of at least one hour.

2. The process of claim 1 wherein the pressure maintained in the compaction and cooling process steps is at least 5,000 psi.

3. The process of claim 2 wherein the temperature maintained in the first heating process step is at least 875° F.

4. The process of claim 1 wherein said polybenzimidazole resin is dried prior to the compaction step by heating said resin to a temperature of at least 350° F. and maintaining said resin at this temperature for at least 4 hours.

5. The process of claim 1 wherein the first heating step is conducted at ambient pressure.

6. The process of claim 1 wherein the addition of a filler is included in the compacting step.

* * * * *